Jan. 29, 1946.    E. P. STAMM    2,393,940
RADIAL SAWING MECHANISM
Filed Jan. 21, 1942    7 Sheets-Sheet 2
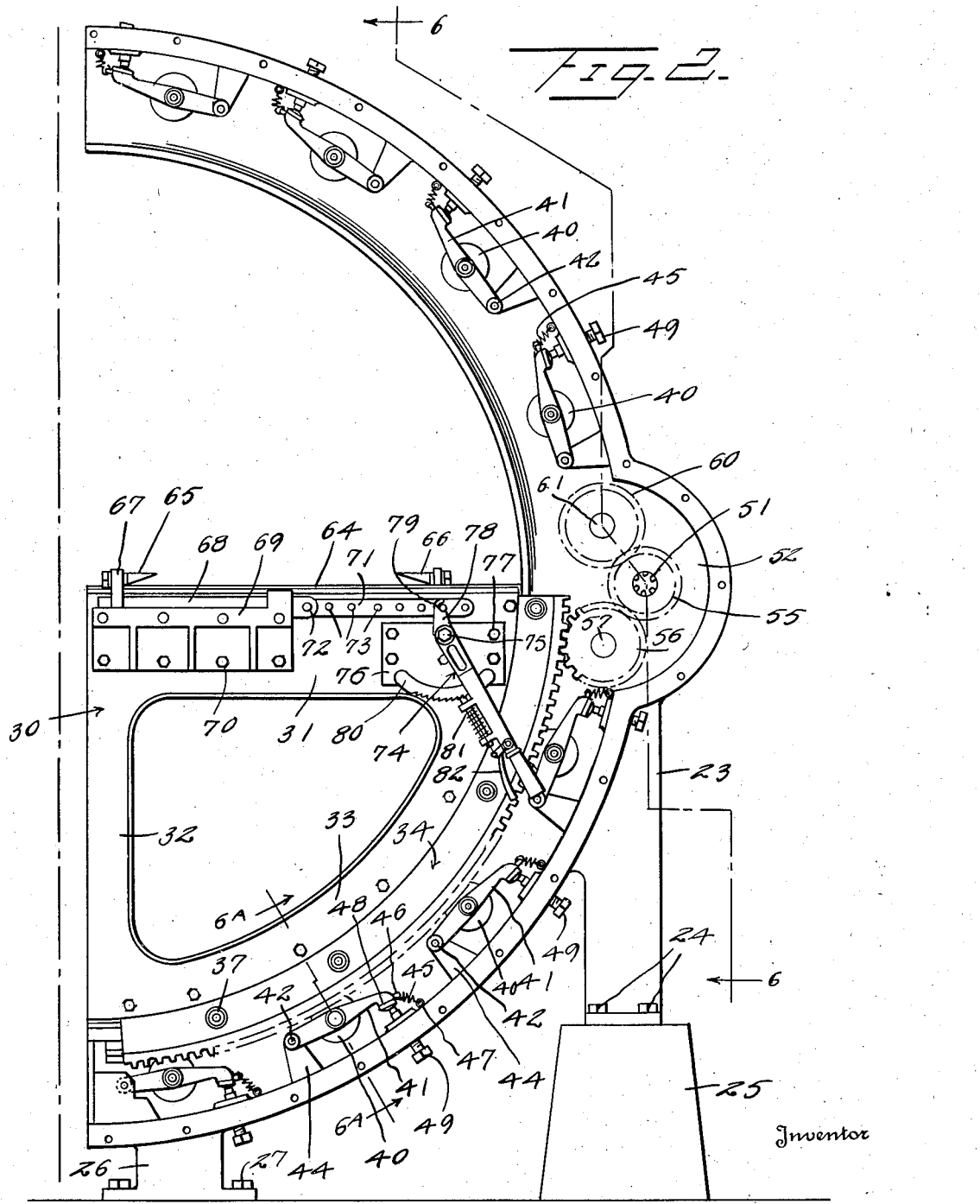
Inventor
E. P. Stamm
By Kimmel & Crowell
Attorneys

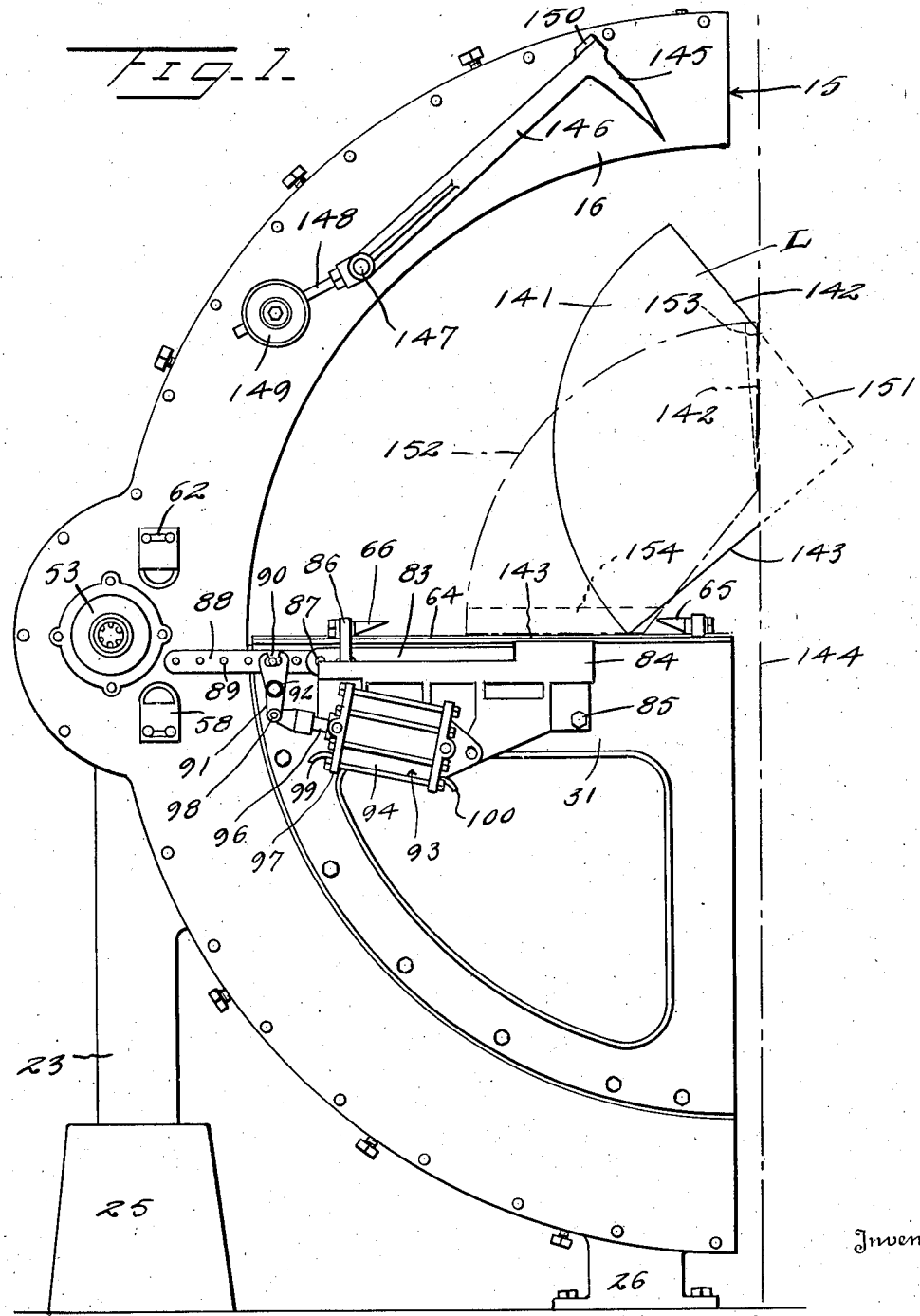

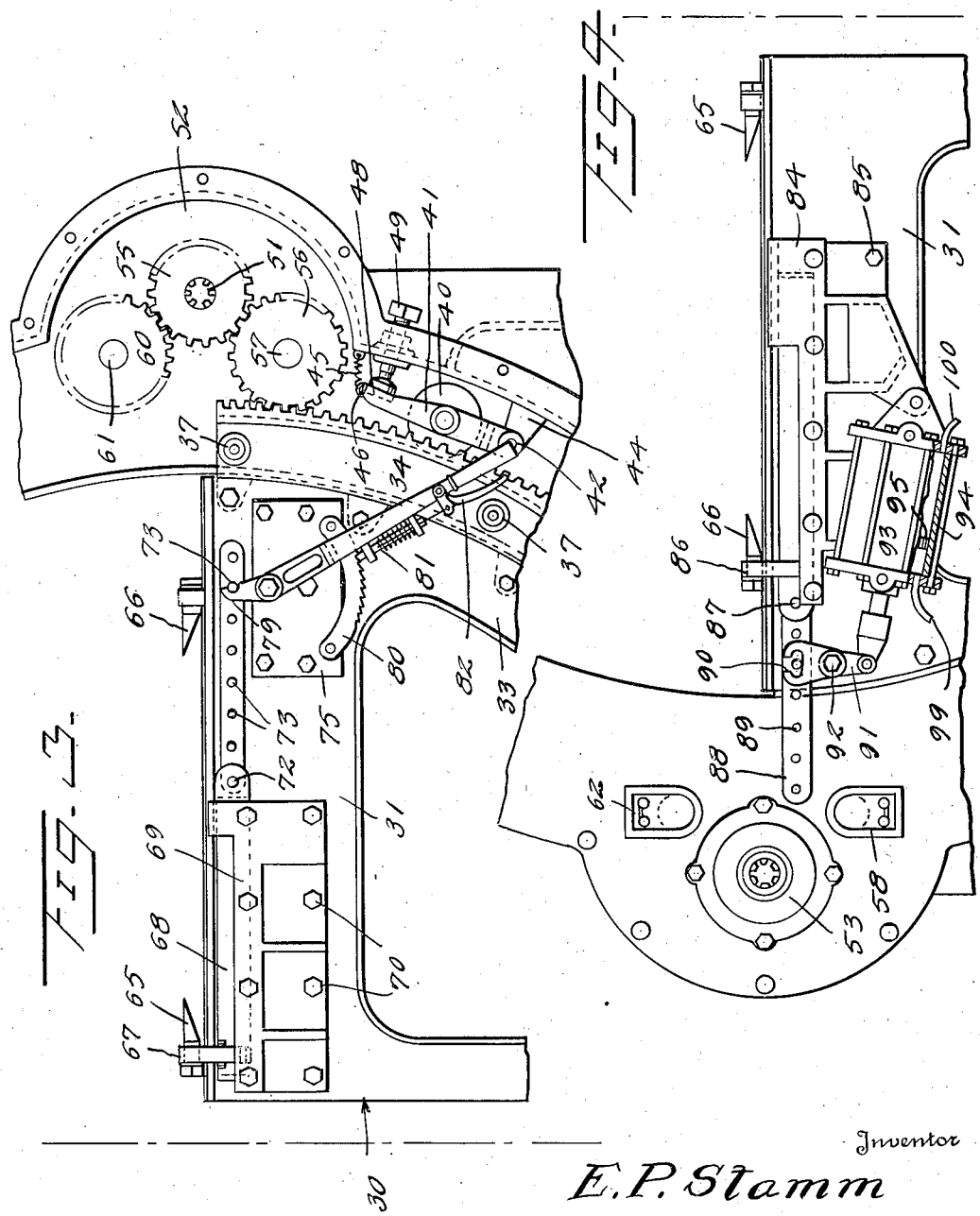

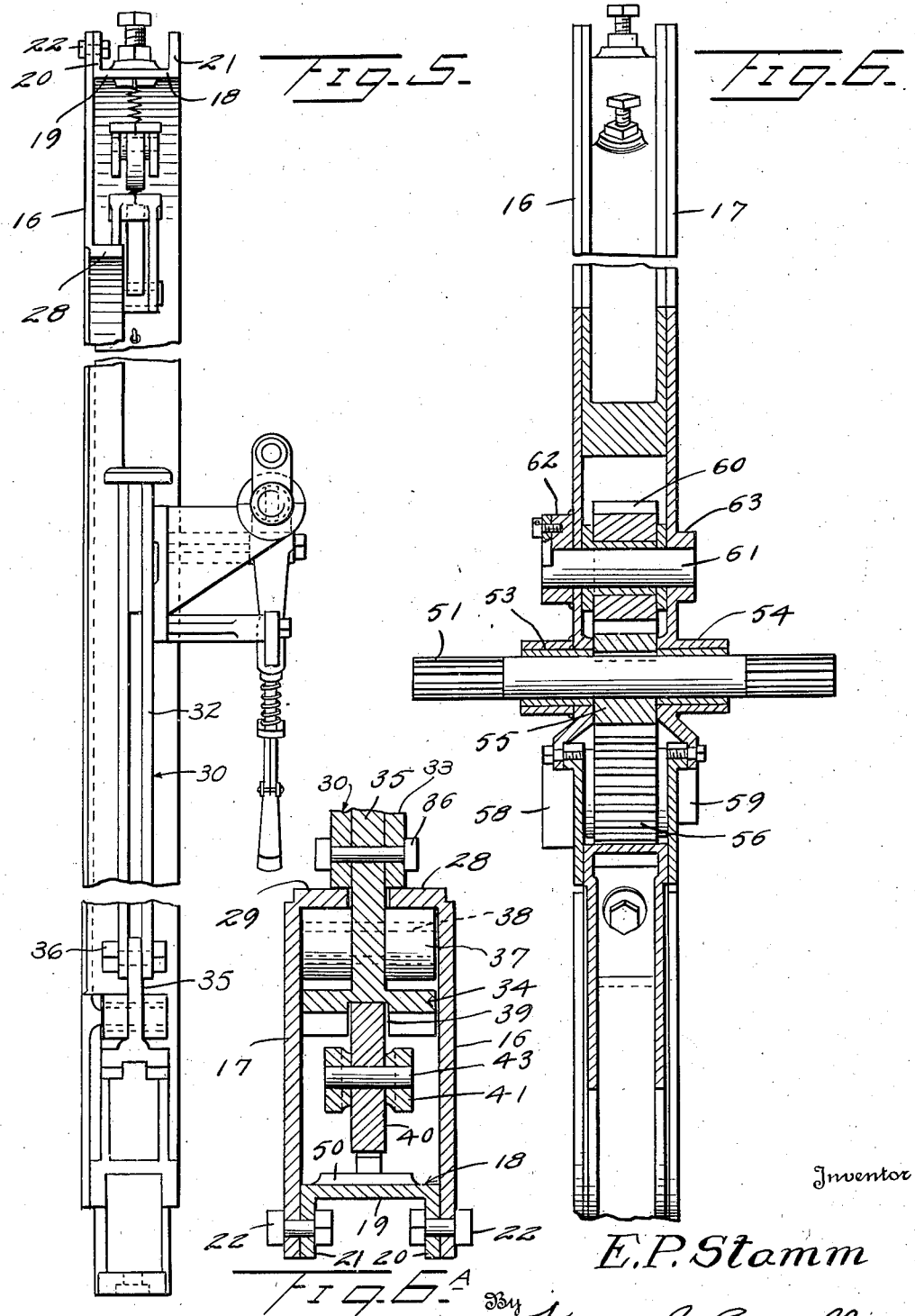

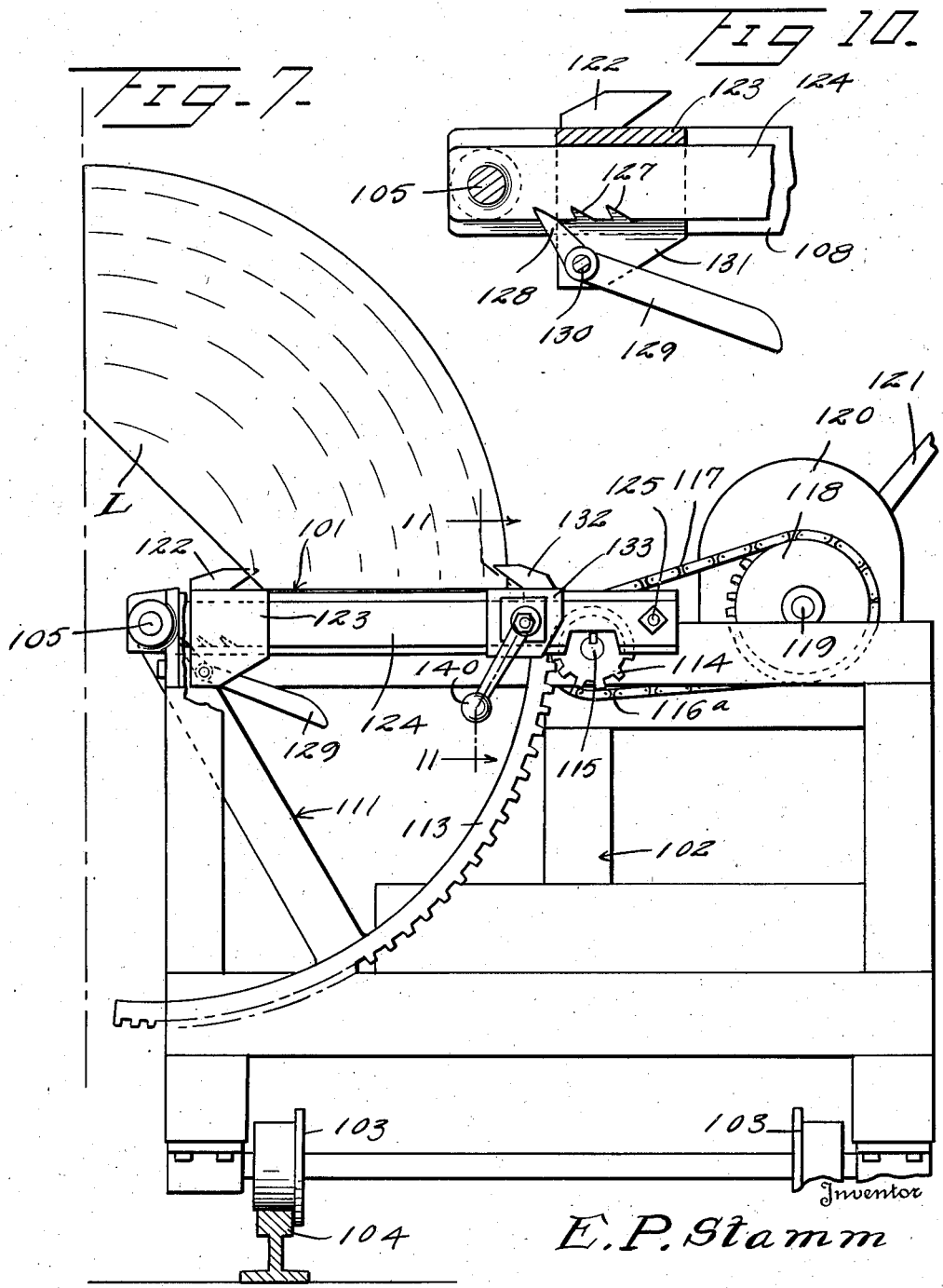

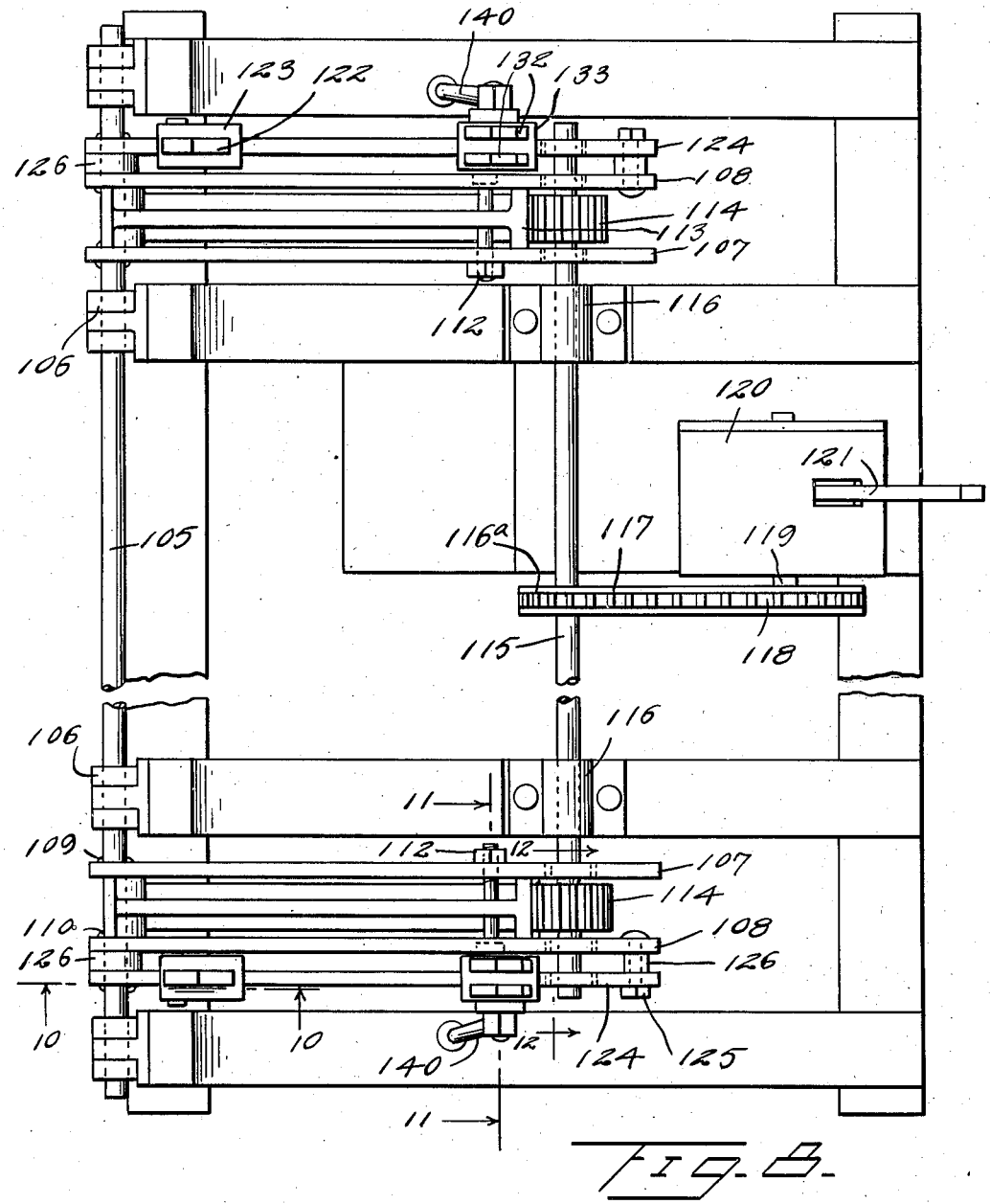

Jan. 29, 1946.  E. P. STAMM  2,393,940
RADIAL SAWING MECHANISM
Filed Jan. 21, 1942  7 Sheets-Sheet 7
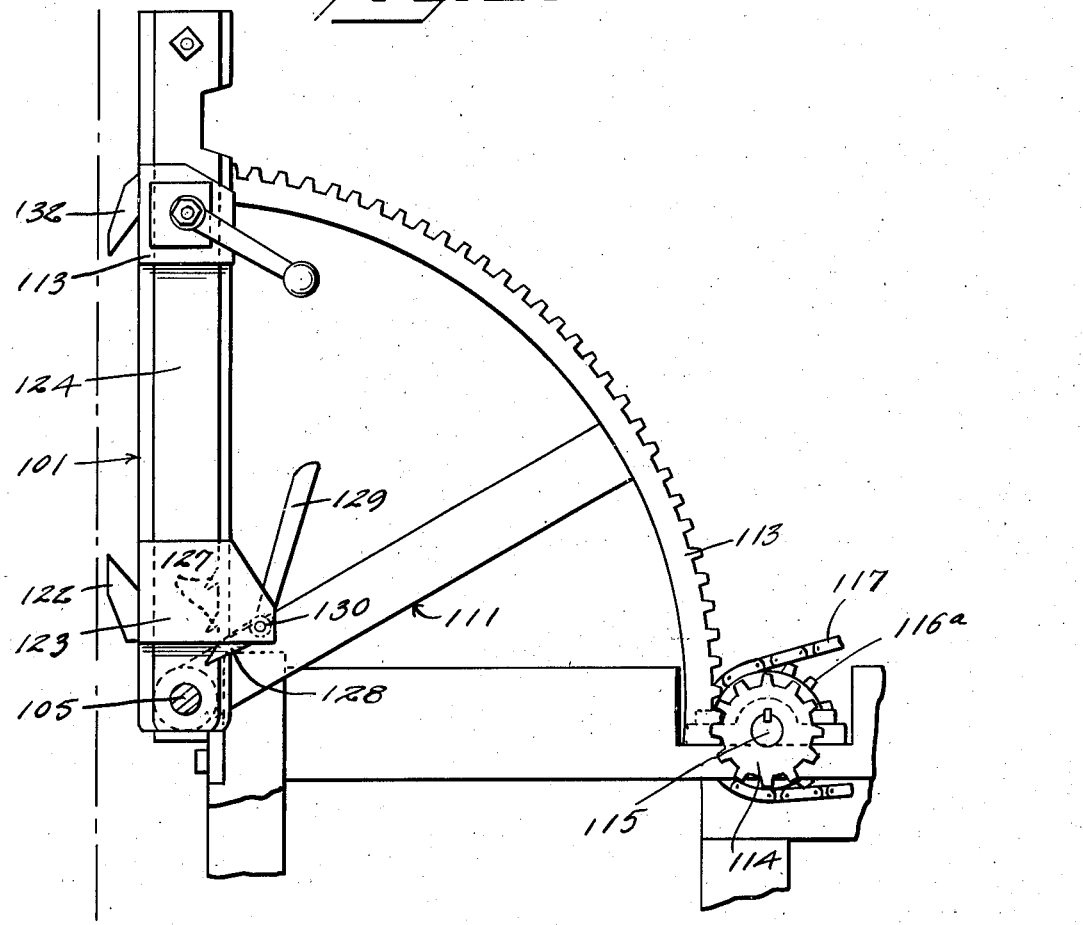
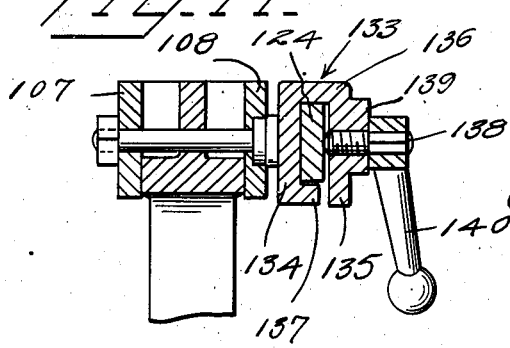
Inventor
E. P. Stamm
By Kimmel & Crowell
Attorneys Patented Jan. 29, 1946

2,393,940

UNITED STATES PATENT OFFICE 2,393,940

RADIAL SAWING MECHANISM

Edward P. Stamm, Portland, Oreg.

Application January 21, 1942, Serial No. 427,642

7 Claims. (Cl. 143—59)

This invention relates to apparatus for radially cutting logs into tapered or beveled boards.

An object of this invention is to provide apparatus whereby a log which is initially quartered may be supported in a manner whereby the lumber cut therefrom will be beveled or tapered for use as siding or the like.

Another object of this invention is to provide apparatus which is inexpensive and may be used by small portable mills for cutting siding lumber with a minimum of waste and a minimum of handling of the logs and the lumber.

A further object of this invention is to provide apparatus of this kind which in the cutting of beveled lumber will produce lumber having the grain thereof substantially perpendicular to the opposite faces thereof so that the lumber when cured or dried will not warp.

A further object of this invention is to provide apparatus which is simple in construction so that it can handle logs of various sizes and will not readily get out of order.

A further object of this invention is to provide apparatus which will make it possible to cut all of the lumber from the log with perpendicular grain thereby eliminating any waste and also eliminating the formation of slash or parallel grain lumber of an inferior grade.

At the present time in the cutting of siding or bevel lumber it is the practice to initially cut up the log into suitable boards which are rectangular in end elevation, and subsequently make an angled cut in each board so as to produce two beveled boards from each rectangular board. This procedure requires an additional cutting operation from that embodied in the present invention, and as every rectangular board does not have the grain thereof perpendicular, the grain of a number of the bevel boards will be out of the perpendicular in the same degree. The apparatus herein described contemplates the bevel cutting of the lumber in a single operation, and when a log is initially set up for sawing, no shifting of the log relative to the apparatus is necessary. Furthermore, with apparatus as herein disclosed, there will be a final board remaining of fairly small thickness which is substantially rectangular in end elevation and which also has the grain thereof perpendicular so that this final board or plank will also be first grade material.

A further object of this invention is to provide a radial sawing apparatus in which the log or cant table floats within a supporting structure and is progressively shifted within the supporting structure a predetermined distance after each cut.

A further object of this invention is to provide a radial sawing apparatus including a semi-circular supporting track and a quarter-circular cant or log supporting and tilting device which is selectively movable within the inner circumference of the track.

A further object of this invention is to provide a radial sawing apparatus including a plurality of rockable combined quadrants and log or cant tilting tables which are mounted on a common shaft, and an improved means for securely holding a log onto the tables.

To the foregoing objects and others which may hereinafter appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

In the drawings:

Figure 1 is a detail side elevation of a bevel sawing mechanism constructed according to an embodiment of this invention, Figure 2 is a detail side elevation looking reversely from Figure 1 with the cover plate removed, Figure 3 is an enlarged fragmentary side elevation similar to Figure 2, Figure 4 is a fragmentary side elevation similar to Figure 1, Figure 5 is a detail front elevation of the mechanism with one cover removed, Figure 6 is a sectional view taken on the line 6—6 of Figure 2, Figure 6A is a sectional view taken on the line 6A—6A of Figure 2, Figure 7 is a detail side elevation of a modified form of this invention, Figure 8 is a detail plan view partly broken away of the invention shown in Figure 7, Figure 9 is an enlarged end elevation partly broken away of the device shown in Figure 7 showing the mechanism in the position assumed thereby at the time the sawing of a log is completed, Figure 10 is a sectional view taken on the line 10—10 of Figure 8, Figure 11 is a sectional view taken on the line 11—11 of Figures 7 and 8, and Figure 12 is a sectional view taken on the line 12—12 of Figure 8.

Referring to the drawings and first to Figures 1 to 6A inclusive, the numeral 15 designates generally a housing structure formed of a pair of outer side plates 16 and 17 and a U-shaped or channel member 18. The channel member 18 is longitudinally curved to form a substantially semi-circle, and the channel member 18 is U-shaped in transverse section having the bight 19 thereof extending between the plates 16 and 17, and the opposite legs 20 and 21 secured by fastening devices 22 to the side plates 16 and 17.

The channel member 18 has secured thereto and extending vertically downwardly from substantially the center thereof a supporting leg or standard 23 which is adapted to be secured as by fastening devices 24 to a longitudinal beam 25 carried by the upper side of a carriage. The carriage (not shown) is adapted to engage on a pair of tracks which are disposed in parallel relation with the saw, so that the frame structure hereinbefore described will be fixed relative to the carriage and will move with the carriage past one side of the saw. The channel member 18 also has secured thereto at the lower portion thereof a second supporting leg or standard 26 which is adapted to be secured as by fastening devices 27 to the upper side of the saw carriage.

The side member 16 is of longitudinally arcuate configuration and is formed on the inner or concave edge thereof with an inwardly extending longitudinally arcuate track or guide 28, the purpose for which will be hereinafter described. The side member 17 is also of the same configuration as the side member 16 and is provided on the inner concave edge thereof with a longitudinally arcuate track 29 confronting the track or guide 28 and spaced therefrom.

A floating log supporting and tilting device generally designated as 30 is disposed within the inner circle of the frame structure 15. The log supporting and tilting member 30 comprises a quadrant formed of a pair of right angularly disposed web members 31 and 32 which are connected together by a longitudinally arcuate web 33. The web 31 constitutes a log supporting web or table and as shown in Figure 2 is initially disposed in a horizontal position.

There are two of these quadrant webs as shown in Figures 5 and 6A which are of like construction. A longitudinally arcuate gear rack generally designated as 34 is movably disposed within the housing 15, and has a longitudinally arcuate web 35 disposed between the webs 33 and secured therebetween by fastening devices 36 (see Figure 6A). The web 35 has rotatably mounted on the opposite sides thereof pairs of circumferentially spaced apart guide rollers 37 journalled on pins 38 extending through the web 35. The rollers 37 engage on the convex faces of the tracks 28 and 29 and provide one means for movably supporting the quadrant structure 30 within the frame structure 15.

The toothed rack 34 is provided in the transverse center thereof with a peripheral groove 39 within which a plurality of rollers 40 movably engage. Each roller 40 is rotatably carried by a rock lever 41 which is rockably mounted at one end on a pin 42 (see Figure 2). The lever 41 is preferably bifurcated as shown in Figure 6A, and each roller 40 is mounted on a roller pin 43 extending between the bifurcations of the lever 41. The bifurcated end of each lever 41 engages on opposite sides of an inwardly extending supporting lug 44 which is fixed relative to the inner side of the bight 19 of the channel member 18.

The free end of the lever 41 is constantly urged outwardly by means of a spring 45 which is secured as at 46 to the lever 41 and as at 47 to the inner side of the channel member 18. The lever 41 on the outer side of the free end thereof is provided with a head 48 which is disposed in confronting position to a lever adjusting set screw 49. The set screw 49 is threaded through the bight 19 of the channel member 18, the bight being preferably provided with an enlargement or boss 50.

The log supporting and tilting member 30 is adapted to be shifted circumferentially through gear rack 34 within the frame structure 15 by means of a gear structure including a drive shaft 51, which is journalled in a gear housing 52 formed at the center of the housing 15. The shaft 51 is journalled in bearings 53 and 54 carried by the side plates or frame members 16 and 17, respectively, and a driving spur gear 55 is fixed on the shaft 51 between the plates 16 and 17. The shaft 51 is adapted to be connected to a suitable operating means such as any standard log carriage setworks for progressively rotating the shaft 51, and raising or lowering the supporting member 30 relative to the frame 15.

The gear 56 is mounted on a countershaft 57 journalled in bearings 58 and 59 carried by the plates 16 and 17, and the gear 56 meshes with the driving gear 55, and also with the arcuate rack 34. A second rack operating gear 60 is carried by a shaft 61 journalled in bearings 62 and 63 which are carried by the side members 16 and 17, respectively, and the gear 60 also meshes with the driving gear 55 in a plane above the axial center of the shaft 51. The gear 60 cooperates with the gear 56 in circumferentially moving rack 34 within frame structure 15 after rack 34 has been raised a slight degree from its lowermost position.

In order to provide a means whereby the log may be tightly clamped on the table 64 which is formed by one side of the quadrant structure 30, I have provided a pair of log clamping dogs 65 and 66. The dog 65 is disposed in outwardly directed position, and is mounted on an ear 67 carried by an elongated slide bar 68. The bar 68 is slidably mounted in a guide structure 69 fixed by fastening devices 70 to one side of the web 31. An elongated link or bar 71 is pivotally mounted as at 72 on the outer end of the slide bar 68, and is provided along the length thereof with a plurality of outstanding pins 73.

A dog adjusting or operating hand lever generally designated as 74 is pivotally mounted as at 75 on a plate 76 which is fixed by fastening devices 77 to one side of the web 31. The lever 74 is provided at its upper end with an arm 78 having a notch 79 within which a selected pin 73 is adapted to engage. A longitudinally arcuate toothed rack 80 is fixed to the plate 76, and the hand lever 74 is provided with a spring-pressed dog 81 engageable with the rack 80 and operated by means of a dog operating lever 82. When the lower end of the hand lever 74 is swung forwardly, the upper end thereof will move outwardly so as to draw the link 71 and the slide 68 outwardly and thereby move the dog 65 outwardly into engagement with the adjacent or inner side of the log mounted on the supporting table 64.

The second or outer dog 66 as shown in Figure 1 is fixedly mounted on a slide 83 which is movable in a guide 84 carried by the web 31 on the side thereof opposite from the plate 75. The guide member 84 is secured to the web 31 by fastening devices 85. The slide 83 has an upstanding lug 86 at its outer end within which the dog 66 is removably mounted. The slide 83 has pivotally connected thereto as at 87 one end of an elongated link or bar 88. The bar 88 is provided with a plurality of outstanding pins 89 which are adapted for selective engagement within the recessed or notched portion 90 of a pivoted dog lever 91. The lever 91 is pivotally mounted intermediate the ends thereof on a pivotal member 92 which is secured to the web 31 adjacent the outer end portion thereof.

The lever 91 is adapted to be removed or operated by means of a fluid pressure operating member 93. The operating member 93 in the present instance is constructed in the form of an air cylinder 94 having a piston 95 (Figure 4) slidable therein. A piston rod 96 is connected with the piston 95 and extends through the rear head 97 of the cylinder 94. The rear or outer end of the piston rod 96 is pivotally connected as at 98 to the lower end of the dog operating lever 91. The operator 93 is adapted to be connected to a source of fluid pressure by means of pipes 99 and 100, which are connected to the opposite ends of the operator 93 so as to thereby move the piston 95 in a selected direction for shifting the outer dog 66.

Referring now to Figures 7 to 12 inclusive there is disclosed a modified form of this invention. In the form of the invention shown in Figures 7 to 12 inclusive, a radially shiftable log supporting or table structure generally designated as 101 is adapted to support a log L in a position whereby the log L may be longitudinally moved with respect to the saw. The table structure 101 is mounted on a supporting carriage 102 including wheels 103 engageable with a pair of tracks 104.

The table structure 101 includes a shaft 105 which is journalled in a plurality of spaced apart bearings 106 secured to the inner side of the carriage 102. The shaft 105 has fixed thereto a pair of the log supporting tables 101, and each one of the tables 101 includes a pair of spaced apart elongated bars 107 and 108 which are fixed as at 109 and 110 to the shaft 105. A geared quadrant 111 is fixed between the bars 107 and 108, being tightly held therebetween by fastening devices or clamping bolts 112. The quadrant 111 includes a longitudinally arcuate toothed rack 113 which is adapted to mesh with a pinion or gear 114 carried by a shaft 115. The shaft 115 is journalled in bearings 116 which are fixed to the upper side of the carriage 102, and in practice, there is one gear 114 for each rack 113. In the present instance, there are shown two of the log supporting tables 101, but it will be understood that there may be two or more of these supporting and shifting tables depending on the length or the size of the log L.

The shaft 115 has fixed thereto intermediate the ends thereof a sprocket 116a about which a chain 117 is trained. The chain 117 also engages about a driving sprocket 118 which is fixed to a shaft 119. The shaft 119 is a part of a manually operable reduction gearing structure 120 of conventional construction, generally known as a sawmill carriage setworks, which has a hand lever 121 connected therewith so that the shaft 115 may be progressively rotated in the desired direction and to the desired degree. This setworks may also be power operated.

In order to provide a means whereby the log L may be tightly clamped on the several supporting tables 101, I have provided an inner dog 122 which is fixed to a slide housing 123. The housing 123 is slidable on an elongated guide bar 124 which is supported in outwardly spaced parallel relation with respect to the bar 108.

The guide bar 124 is fixed relative to the bar 108 by fastening devices 125, and spacing members 126 are interposed between the two bars 108 and 124. The bar 124 on the lower side thereof and adjacent the inner or forward end is provided with a plurality of notches 127 within which a dog holding finger 128 is adapted to engage (see Figures 9 and 10). The finger 128 is carried by a hand lever 129 pivotally mounted on a pivot 130 carried by a pair of depending ears 131 formed as part of the slide housing 123.

A second log clamping dog 132 is disposed in confronting position with respect to the dog 122 and is fixed relative to a slide housing 133 also slidable on the guide member 124. The housing 133 shown more clearly in Figure 11 includes an inner wall 134, an outer wall 135, and a top wall 136. An outwardly projecting flange 137 extends outwardly from the inner wall 134 and engages beneath the lower edge of the guide member 124. A slide clamping bolt 138 is threaded through a boss 139 which is fixed relative to the outer wall 135 of the slide 133, and a handle 140 is fixed to the bolt or threaded clamping shaft 138. The inner end of the bolt or clamping shaft 138 is adapted to frictionally bear against the outer side of the guide 124 so as to frictionally hold the slide 133 in adjusted position.

In the use and operation of this device and referring first to Figures 1 to 6A inclusive, the log L is initially mounted on the several log supporting tables 64 as shown in Figure 1 in the position designated 141. In this position the quartered log is disposed as shown in full lines in Figure 1 with the right angle faces 142 and 143 thereof projecting inwardly and across the path of the saw 144. The log L is held in the position 141 by engagement of the lower end thereof with the inner dog 65, and the upper edge of the log L is supported by means of a pivoted dog 145. The dog 145 is carried by a lever 146 pivotally mounted on a pivot 147. The pivot 147 is carried by the side member 16, and the dog member 145 is adapted to be manually swung downwardly into engagement with the flat side 142 of the log L.

An outwardly directed shaft or arm 148 is carried by the lever 146 and has adjustably mounted thereon a balancing or counterweight 149 which is adapted to normally hold the dog 145 in an uppermost or disengaged position. An outwardly extending stop lug 150 is fixed to the side member 16 in the path of the swinging movement of the dog 145 so that the dog 145 will be normally disposed in the position shown in Figure 1. In operative position the dog 145 is manually swung downwardly and the appointed end thereof is projected into the log L so that a triangular heart portion 151 may be cut from the log L. After this triangular portion 151 has been cut from the log L, this log is then shifted to the position 152 shown by the dot and dash lines in Figures 1.

In this position the flat face 143 may rest on the upper sides of the supporting tables 64, and the flat side 142 is disposed in a substantially vertical position projecting beyond the inner end portions of the several frames 15. The shaft 51 may then be rotated to raise the outer end of the quadrant structure 30 thereby tilting the flat face 142 of the log L with respect to the saw 144. The saw carriage is then run past the saw, and this will then cut a wedge shaped or beveled board 153 from the adjacent face of the log L.

After one board 153 has been cut from the log L, the carriage is returned to its starting position, and the shaft 51 is then rotated for the desired amount to cut a second wedge-shaped board therefrom. This procedure will progress until a very small substantially rectangular plank 154 remains, which remaining or back plank may be trimmed at the longitudinal edges thereof to form a rectangular board.

The structure shown in Figures 7 to 12 inclusive operates similar to the structure shown in Figures 1 to 6A inclusive. With a construction of this kind, after the log L has been quartered and the triangular heart section cut therefrom similar to the heart section 151 in Figure 1, the remaining beveled boards will have the grain thereof substantially perpendicular to the opposite faces thereof. This perpendicular grain will be found in each beveled board and will also be found in the remaining or back board similar to the back board 154 in Figure 1 so that all of the beveled boards or lumber cut from the log L will be first grade perpendicular grain, and the only waste will be caused by the saw passing through the log. The heart section may be cut into the desired lumber or boards in any suitable manner.

With a radial sawing mechanism as hereinbefore described, it is possible to provide a small mill with this radial sawing mechanism so that the small mill will be capable of handling logs of almost any size, and will be capable of turning out first grade lumber from the entire log. The initial cutting of the beveled lumber from the log eliminates the present practice of performing a second cutting operation in order to obtain the beveled logs. This second operation is performed by a diagonal cut through a rectangular board which is not in every instance a board having perpendicular grain.

What I claim is:

1. A radial sawing mechanism for mounting on an endwise movable carriage comprising a substantially semi-circular frame structure, said frame structure including an intermediate longitudinally arcuate frame member and a pair of outer side members fixed relative to said intermediate member, longitudinally arcuate confronting flanges carried by said side members, a quadrant-shaped log table engaging within said frame, means engageable with said flanges rotatably supporting the outer portion of said table within said frame, said table including an arcuate toothed rack, and gear means carried by said frame engageable with said rack for circumferentially shifting said rack relative to said frame, said gear means including a drive gear, upper and lower driven gears meshing with said driving gear and engageable with said rack, said upper gear being disengaged from said rack when said table is in a lowermost position, said lower gear being disengaged from said rack when said table is in an uppermost position, and both of said driven gears being in mesh with said rack when said table is in a position between the uppermost and lowermost positions.

2. A radial sawing mechanism comprising a frame for mounting on an endwise movable log carriage, said frame including an inner longitudinally arcuate frame member, a pair of longitudinally arcuate side members fixed to said inner member, confronting flanges carried by the inner edges of said side members for providing a guide means, a quadrant shaped log table disposed within said frame, said table including a longitudinally arcuate toothed rack, rollers carried by said rack engageable with said guide means, said rack having a longitudinal groove intermediate the opposite sides thereof, a plurality of roller supporting levers carried by said inner frame members, rollers carried by said levers engaging within said groove and correlated with said first rollers, for rotatably supporting said table within said frame, adjusting means for said levers, and gear means carried by said frame engageable with said rack for circumferentially adjusting said rack relative to said frame.

3. A radial sawing mechanism comprising an upright frame member for mounting on an endwise movable log carriage, said frame member including an inner longitudinally arcuate frame member, a pair of outer side frame members, means fixedly securing said side members to said inner member, a longitudinally arcuate inwardly projecting guide flange carried by each side member, said flanges having the inner edges thereof disposed in spaced relation, a quadrant shaped log table having the outer portion thereof loosely disposed between said flanges, a series of rollers carried by the outer portion of said table engageable with said flanges, said table also including a longitudinally grooved toothed rack disposed between said side members, a second series of rollers, means rockably supporting said second series of rollers from said inner frame member, said second series of rollers engageable in the groove of said rack and coacting with said first series of rollers in movably supporting said table relative to said frame, adjusting means for said roller supporting means and gear means carried by said frame engageable with said rack for circumferentially adjusting said table relative to said frame.

4. A radial sawing mechanism comprising a frame for mounting on an endwise movable log carriage, said frame comprising an inner longitudinally arcuate frame member, a pair of longitudinally arcuate side members, means fixedly securing said side members to said inner member, confronting guide flanges carried by the inner edges of said side members providing a longitudinally arcuate guide track, a quadrant shaped log table including a longitudinally arcuate toothed rack engageable between said side members, a series of inner rollers carried by said table inwardly of said rack and engaging said guide track, said rack having a longitudinally extending groove therein, a second series of rollers engageable within the groove of said rack, spring pressed supporting means for said second series of rollers carried by said frame, adjusting means for said supporting means and gear means carried by said frame engageable with said rack for circumferentially adjusting said table relative to said frame.

5. A radial sawing mechanism comprising a substantially semi-circular frame for mounting on an endwise movable log carriage, a quadrant shaped log table, means supporting the outer portion of said table relative to said frame for movement circumferentially of said frame, said means including a plurality of rock levers carried by said frame, rollers carried by said levers, means carried by said frame engageable with said levers for adjusting the latter, and means for circumferentially adjusting said table relative to said frame.

6. A radial sawing mechanism for mounting on an endwise movable log carriage comprising a substantially semi-circular stationary frame, a quadrant-shaped log table movable in said frame, said table including a toothed rack having an arc less than ninety degrees, a driving gear for said table, and upper and lower gears meshing with said driving gear, said lower gear meshing with said rack when the latter is in a lowermost position and said upper gear also meshing with said rack when the latter is moved upwardly, said lower gear being disengaged from said rack when the latter is in an uppermost position.

7. A radial sawing mechanism for mounting on an endwise movable log carriage comprising a substantially semi-circular stationary frame, a quadrant-shaped log table movable in said frame, means supporting said table for rotary movement in said frame, said table including a toothed rack having an arc less than ninety degrees, a driving gear for said table, and upper and lower gears meshing with said driving gear, said lower gear meshing with said rack when the latter is in a lowermost position and said upper gear also meshing with said rack when the latter is moved upwardly, said lower gear being disengaged from said rack when the latter is in an uppermost position.

EDWARD P. STAMM.